United States Patent [19]

Roe

[11] Patent Number: 4,780,143
[45] Date of Patent: Oct. 25, 1988

[54] METHODS FOR SUPPRESSING CEMENT CLINKER DUST EMISSIONS

[75] Inventor: Donald C. Roe, Southampton, Pa.

[73] Assignee: Betz Laboratories, Inc., Trevose, Pa.

[21] Appl. No.: 41,903

[22] Filed: Apr. 24, 1987

[51] Int. Cl.⁴ .............................................. C04B 7/52
[52] U.S. Cl. ...................................... 106/102; 106/88; 252/88
[58] Field of Search ..................... 106/88, 102; 252/88

[56] References Cited

U.S. PATENT DOCUMENTS

| | | | |
|---|---|---|---|
| 943,667 | 12/1909 | Ellis | 252/88 |
| 2,621,115 | 12/1952 | Van Order | 44/6 |
| 2,646,361 | 7/1953 | Rostler | 106/238 |
| 2,854,347 | 9/1958 | Booth et al. | 427/154 |
| 3,811,660 | 5/1974 | Cole, Jr. | 261/18 B |
| 3,937,283 | 2/1976 | Blauer et al. | 166/307 |
| 3,954,662 | 5/1976 | Salyer et al. | 252/88 |
| 3,980,136 | 9/1976 | Plummer et al. | 166/280 |
| 4,000,992 | 1/1977 | Cole, Jr. | 55/87 |
| 4,087,572 | 5/1978 | Nimerick | 427/214 |
| 4,136,050 | 1/1979 | Brehm | 252/88 |
| 4,169,170 | 9/1979 | Doeksen | 427/155 |
| 4,171,276 | 10/1979 | Brehm | 252/88 |
| 4,200,413 | 4/1980 | Fitch | 406/49 |
| 4,301,119 | 11/1981 | Cobbs et al. | 422/133 |
| 4,380,459 | 4/1983 | Netting | 55/87 |
| 4,400,220 | 8/1983 | Cole, Jr. | 134/18 |
| 4,417,992 | 11/1983 | Bhattacharyya et al. | 252/88 |
| 4,551,261 | 11/1985 | Salihar | 252/88 |
| 4,561,905 | 12/1985 | Kittle | 134/25.1 |
| 4,571,116 | 2/1986 | Patil | 404/76 |
| 4,605,568 | 8/1986 | Kober | 427/220 |
| 4,650,598 | 3/1987 | Roberts et al. | 252/88 |

FOREIGN PATENT DOCUMENTS

| | | | |
|---|---|---|---|
| 50-40491 | 4/1975 | Japan. | |
| 0067523 | 6/1981 | Japan | 55/87 |
| 57-98579 | 6/1982 | Japan. | |
| 9051993 | 3/1984 | Japan | 252/88 |
| 9223781 | 12/1984 | Japan | 252/88 |
| 453421 | 1/1975 | U.S.S.R. | 252/88 |
| 566788 | 8/1977 | U.S.S.R. | 106/102 |
| 0589009 | 1/1978 | U.S.S.R. | 55/87 |
| 0916764 | 4/1982 | U.S.S.R. | 252/88 |
| 0934054 | 6/1982 | U.S.S.R. | 252/88 |
| 1078101 | 3/1984 | U.S.S.R. | 55/87 |
| 1133283 | 1/1985 | U.S.S.R. | 252/88 |
| 602406 | 5/1948 | United Kingdom. | |

OTHER PUBLICATIONS

"Foam Suppression of Respirable Coal Dust", Final Report, Dec. 1970, Salyer et al.
"Petroleum Based DCA's to Control Fugitive Dust", Proceedings of the Annual Meeting of the Fertilizer Industry-Roundtable 1977, Series 27, pp. 94–96.
*Agricultural Engineering*, Sep. 1985, pp. 9–12.

*Primary Examiner*—Steven Capella
*Attorney, Agent, or Firm*—Alexander D. Ricci; Steven D. Boyd

[57] ABSTRACT

A method of suppressing dust generation emanating from cement clinker dust by applying a foamed dust control treatment thereto. The foam is provided with an effective defoaming agent which, upon slurrying of the clinker and other ingredients (e.g., sand, gypsum, aggregate) to form the desired mortar, inhibits foam formation in the mortar, thus not significantly increasing air entrapped in the slurried mortar.

14 Claims, No Drawings

METHODS FOR SUPPRESSING CEMENT CLINKER DUST EMISSIONS

FIELD OF THE INVENTION

The present invention pertains to methods for applying an effective dust control agent onto cement clinker after same has been calcined.

BACKGROUND OF THE INVENTION

Portland cement is commonly used in cement and concrete mixtures for a variety of commercial and individual purposes such as for building structures, roads and highways, bridges, concrete pipe and in the formation of myriad precast construction components. Presently, many different types of Portland cement are produced in the United States with specifications for each being dictated by the intended end use.

The raw materials involved include limestone, clay, shale, iron containing materials and siliceous materials. These materials are normally obtained by drilling and blasting techiques with the raw materials then being transported from the quarry to crusher and screening operations.

The crushed and/or screened materials are then further processed to obtain "Portland cement clinker" which clinker consists essentially of hydraulic calcium silicates. Portland cement is formed by adding gypsum and then pulverizing the mixture by means of a ball mill or the like. It is then either packaged or stored. The end user then adds water, aggregate, or sand, etc. to the dry ground clinker-gypsum mixture to form the desired mortar or concrete (end product).

The raw materials obtained from the quarry are usually subjected to either a "dry" or "wet" process prior to calcination. For example, in the "dry process", the raw materials are dried and ground. The ground particles are then separated by size, with overly large particles being re-ground. The products are then blended and stored prior to calcination. In the "wet process", the raw materials are slurried and then ground in slurry state prior to calcination.

In the calcination step, the blended material, from either the "dry" or "wet" process, is fed to an elongated rotating kiln operating at temperatures up to about 2700° F. The product exits the kiln at temperatures from about 1800° F. to 2700° F. and is referred to as cement clinker. The clinker is then cooled via air draft circulation or similar means, stored, then normally blended with gypsum and sent to a rotary grinding or finishing mill. The product is then stored prior to packaging and bulk transport by rail, barge or truck.

Although the problem of fugitive dust emissions may be present at various points through the Portland cement process, it is especially troublesome when the hot clinker (e.g., 150° to 400° F.) is transferred after the clinker cooler to a conveyor upstream from the finishing mixing mill step or as the cooling clinker is transferred to a storage pile.

In order to minimize the emission of fugitive dust emanating from the raw materials or from the clinker, numerous approaches have been tried. Typically, process transfer points may be hooded or covered. Attempts at wet dust suppression have been generally ineffective. Clinker may actually prematurely "set-up" or cake, adversely affecting the commercial value and performance of the final cement product.

Experiments have been undertaken with the use of foamed dust control treatments. Despite the superior dust control efficacy of foamed treatments, the foam results in an increase in entrained air in the resulting cement products. This factor has severely curtailed use of foams since the increased air entrapment causes undesirable variation from the air entrainment specifications for particular Portland cement grades. More importantly, undesirable increases in the air entrapped within the product may lead to product compressive strength reduction that could cause structural failure of the cement.

These and other problems in the art of cement clinker dust control are addressed by the present invention.

SUMMARY OF THE INVENTION

In accordance with the invention, a foamed dust control additive treatment is applied to the clinker after it exits from the clinker cooler. Later, when the cement is slurried to form the desired mortar, foam formation is then inhibited in such a manner as to not result in a significant increase in the air entrapped in the final cement product.

By use of the phrase "not significantly increased", I mean to state that, as measured by ASTM No. C185, the air content of a mortar prepared with a foam treated cement does not increase by greater than about 20% when compared to untreated cement mortar.

In accordance with the invention, a defoaming/antifoaming agent is incorporated into the foamed dust control formulation. When added with a foamed dust control agent to the clinker, certain anti-foaming agents do not inhibit foam formation, and may desirably contribute to foam formation. However, when the final cement product is to be made, the anti-foaming agent interacts with one or more components in the mortar mixture in such a way that it actually inhibits or regards foam formation at this enduse stage. Accordingly, air entrapment in the resulting cementitious product is not significantly increased, and, in certain cases, may be decreased.

PRIOR ART

Of interest is U.S. Pat. No. 4,561,905 (Kittle). This patent is specifically directed toward methods for suppressing coal dust dissemination by application of a foamed water-diluted emulsion of water, a surfactant, and an oil which exhibits a tacky characteristic on the coal dust. There is no hint or suggestion in the -905 Kittle patent directed toward use of such foams to inhibit dust dissemination by cement clinker dusts. In fact, the preferred oils used in accordance with the Kittle foams range from approximately 600 to 7,000 SUS (Saybolt Universal Seconds) at 38° C. As shown hereafter in the Examples, such high viscosity oils are ineffective in causing inhibition or retardation of foam formation as herein specified, since such higher viscosity oils actually lead to increased levels of air entrainment in the finished cement product.

Of further interest is U.S. Pat. No. 4,551,261 (Salihar) which discloses that the generation of dust by coal and other solid particulate materials may be suppressed by the application of a foam comprising water, a foaming agent, and elastomeric water insoluble polymer. The foaming agent may be selected from a variety of anionic and nonionic surfactants and combinations thereof. This -261 patent is devoid of any suggestion as to utilization on cement clinker dusts. Further, this prior art patent is devoid of any suggestion whatsoever as to the step of inhibiting or retarding foam formation as is herein required so as to not significantly increase the amount of air entrapped in the final cementitious product.

Of possible interest is U.S. Pat. No. 4,400,220 (Cole) which is directed toward the prevention of dust dissemination with coal or other dusty products. The -220 Cole patent is directed toward the use of foamed air/water/surfactant foams which are to be applied to the coal at various conveyor and transfer points in the coal handling process.

DETAILED DESCRIPTION OF THE INVENTION

I have found that a water/surfactant foam may be applied to cement clinker dust to thereby inhibit dust emanation therefrom without significantly increasing the air entrapment level of the resulting finished cementitious product.

In accordance with the invention, a defoaming agent such as a light viscosity process oil may be foamed with water and with anionic and/or nonionic surfactants. By light viscosity, I mean process oils having an SUS viscosity at 38° C. of from about 60–600, preferably 60 to around 300. These light viscosity process oils are commercially available under the "Shellflex", "Tellura" and "Tufflo" trademarks.

When applied to the cement clinker in amounts of about 0.25% to 2.5% (by weight of water applied in the foam) in a foamed dust control treatment formulation, these light viscosity oils do not retard foam formation. Hence, the surfactant/oil/water foam exhibits superior cement clinker dust suppression. In contrast, when the treated clinker is used in preparing a cement mortar, the light viscosity process oil remaining on the clinker from the prior foam treatment is diluted to about 1.5 to about 200 ppm (per million parts of the cement mortar mix). Within this latter range and environment the oil acts as a defoaming/anti-foaming agent inhibiting or retarding foam formation so as to not significantly increase the amount of air entrained in the mortar.

In addition to the use of light process oils, other antifoam materials, including fatty alcohols, are contemplated as being acceptable defoaming/anti-foaming agents for this purpose.

The foam for the clinker dust control treatment may be formed and applied via conventional techniques such as those disclosed in U.S. Pat. No. 4,400,220 (Cole), the contents of which are hereby incorporated by reference.

The water/surfactant (foaming agent) solution and oil are fed to a pump which feeds the water/surfactant/oil emulsion into a foam generating device. Two approaches are presently envisioned for foam control procedures in which a light viscosity antifoam oil is desired. They are:

| Alternative One | |
|---|---|
| 1. Water/surfactant solution | |
| water | 50–90% |
| anionic or nonionic surfactants of the types described in U.S. Pat. No. 4,551,261 | 10–50% |
| 2. Oil | 100% |
| light process oil 108 SUS at 38° C. "Tufflo 105" naphthenic oil | |
| Alternative Two | |
| 1. Water/surfactant (low salt tolerant) solution | |
| water | 50–90% |
| low salt tolerant surfactant | 10–50% |
| 2. Oil | 100% |
| "Tufflo 105" | |
| OR | |
| 1. Water/surfactant (low salt tolerant) solution | |
| BioSoft "D" series Stepan Chemical sodium dodecylbenzene sulfonate | 15–23 wt % |
| BioTerge AS-40 surfactant Stepan Chemical sodium $C_{14}$–$C_{16}$ olefin sulfonate | 2–5 wt % |
| Water | Remainder |
| 2. Oil | 100% |
| "Tufflo 105" | |

By low salt tolerant, I mean that the surfactant used to produce the dust control foam will lose its surface active properties by reaction with inorganic salts when brought into contact with the mortar mix. As a result, the surfactant will have little or no effect on the air content of the final cement product. An acceptable formulation including a low salt tolerant surfactant will not increase air entrapment values by more than about 20% when applied to the clinker in an amount necessary to suppress cement clinker dust emissions by about 70–100%, when aircontent of the mortar is determined according to ASTM C185 specifications. When low salt tolerant surfactants are used, the water used to form the dust control foam should be relatively low in hardness (0 to 250 ppm as $CaCO_3$) and other dissolved salts so that the low salt tolerant surfactant will be able to provide its intended function in helping to build the foam. Conversely, when the mortar is prepared, a high hardness (1000 to 5000 ppm as $CaCO_3$) water is encountered in the aqueous phase of the slurry due to dissolution of free lime (CaO), gypsum ($CaSO_4$) and other species; thus foam formation is inhibited ior retarded at the mortar preparation stage.

When the preferred light viscosity process oil is used as the antifoam, the concentration of same applied in the foamed dust control treatment should exceed about 0.25% so that the oil will permit foam formation.

After the treated clinker has been gound into a cement product and when it is desired to prepare the mortar, the clinker is diluted to the extent that from about 1.5 to about 200 ppm of the oil antifoam is present in the mortar mix. In this dosage level range and environment, the light viscosity process oil serves as an antifoam, inhibiting air entrapment in the finished product.

EXAMPLES

I. Method for Applying Foaming Agents in the Laboratory

In order to determine the effects of various products and formulations on the air entrainment value of cement mortar, treatments were incorporated into the water used to prepare the mortar mix. Aside from the inclusion of chemical treatments, the mortar was prepared in the usual way (ASTM C305) as specified in the procedure for determining the air content of hydraulic cement mortars (ASTM C185).

II. Method for Measuring the Air Content of Hydraulic Cement Mortars

Air content measurements were made according to ASTM C185 specifications in a certified cement testing laboratory. Where treatments were applied to the clinker (in the field), the clinker was then ground with gypsum in a finishing mill to produce Portland I/II cement. Where treatments were incorporated into the water used to make cement mortar (in the laboratory), a standard bag of Portland I/II cement was used as cement.

The ASTM standard method for measuring air content consists of preparing a batch of standard mortar (350 g of cement, 1400 g of standard sand and sufficient water to give a flow of 87.5±7.5% in accordance with Section 5.3 of ASTM C185) which is mixed in accordance with ASTM C305. The mortar is then placed in a 400 mL cylindrical measure and weighed. Given the specific gravity of the cement and standard sand, and knowing the amount of water used to prepare the mortar, the % air in the mortar mix is calculated.

III. Laboratory Foam Studies

The laboratory foam studies were conducted by adding 10 mL of solution (treatment(s)+deionized water or deionized water containing 1000 ppm $Ca^{++}$ from $CaCl_2$) into a 100 mL, stoppered graduated cylinder. The cylinder was then shaken vigorously for 30 seconds, and the volume of foam produced was recorded.

Results are reported in Tables I to IV.

TABLE II

Lab Tests Conducted at Western Cement Manufacturer's Location

| Test # | Product | Solution, % | mLs/350 gm | Gallon/Ton | % Air |
|---|---|---|---|---|---|
| Control | — | — | — | — | 8.2 |
| A | AA | 1.0 | 11.0 | 0.072 | 21.3 |
| B | AA | 1.0 | 4.6 | 0.032 | 14.7 |
| C | AD | 1.0 | 11.0 | 0.072 | 16.7 |
| D | AD | 1.0 | 4.6 | 0.032 | 14.8 |
| E | AE | 1.0 | 4.6 | 0.032 | 15.4 |
| F | AA | 1.0 | 4.6 | 0.032 | 12.2 |
|  | AF | 100* | 0.14 | 0.100 |  |
| G | AE | 1.0 | 1.4 | 0.010 | 18.6 |
|  | AA | 1.0 | 4.6 | 0.032 |  |
| H | AE | 1.0 | 1.4 | 0.010 | 13.7 |
|  | AD | 1.0 | 4.6 | 0.032 |  |

*Product AF, being a hydrocarbon, was not water soluble

TABLE III

Western Location Manufacturer's Cement Lab Test Results

| Test No. | Product | Solution Conc (%) | Feedrate mLs/350 g | Feedrate Gal/Ton | % Air | Comments |
|---|---|---|---|---|---|---|
| 1 | None | — | — | — | 8.1 | Unknown cement sample used to demonstrate test |
| 2 | None | — | — | — | 8.9 | Same bag of Portland I/II cement used for this and all |

TABLE I

Field Test Results for Clinker Dust Suppression (Western Location)

| Test No. | Product | Product Feedrate (Gal/Ton) | Total Solution Feedrate (Gal/Ton) | Back Pres. psig | Dust Suppression, % | % Air | Comments |
|---|---|---|---|---|---|---|---|
| 1 | AA | 0.020 | 0.82 | 5-7 | 0 | — | Foam application to screw conveyor |
|  | AB | 0.091 |  |  |  |  |  |
| 2 | AA | 0.020 | 1.91 | 7-10 | 0 | — | Conveyor pluggage |
|  | AB | 0.091 |  |  |  |  |  |
| 3 | AA | 0.020 | 2.73 | 12-15 | 75 | — | Foam application to drag chain |
|  | AB | 0.091 |  |  |  |  |  |
| 4 | AA | 0.064 | 3.82 | 18-20 | 100 | 17.6 | To drag chain |
|  | AB | 0.136 |  |  |  |  |  |
| 5 | AA | 0.048 | 3.82 | 18-20 | 90 | 17.6 | To drag chain |
| 6 | AA | 0.021 | 3.82 | 15-18 | 90 | 16.5 | To drag chain |
| 7 | AA | 0.014 | 2.73 | 6-8 | 50 | 13.1 | To drag chain |
| 8 | AC | 0.024 | 4.10 | no foam formed | 50 | 11.2 | Spray application to drag chain |
| 9 | AC | 0.048 | 4.10 | no foam formed | 50 | 11.1 | Drag chain pluggage |
| 10 | AA | 0.020 | 4.10 | 15-18 | 85 | 11.4 | Foam application to drag chain |
|  | AF | 0.024 |  |  |  |  |  |
| 11 | AA | 0.020 | 4.10 | 15-18 | 85 | 9.3 | Foam application to drag chain |
|  | AF | 0.048 |  |  |  |  |  |
| 12 | AA | 0.024 | 2.73 | 15-18 | 100 | 8.4* 8.3 8.3 7.8 | Foam application to drag chain |
|  | AF | 0.095 |  |  |  |  |  |
| 13 | AA | 0.024 | 3.82 | 15-18 | 100 | 13.6* 12.8 | Foam application to drag chain |
|  | AF | 0.024 |  |  |  |  |  |
| 14 | AA | 0.042 | 3.82 | 15-18 | 100 | 8.3* 8.1 7.8 | Foam application to drag chain |
|  | AF | 0.085 |  |  |  |  |  |
| 15 | AD | 0.024 | 3.82 | 15-18 | 100 | 7.4* 9.8 11.4 | Foam application to drag chain |
| 16 | AD | 0.024 | 2.73 | 15-18 | Poor - Problems with all |  |  |
| 17 | AD | 0.050 | 4.37 | 15-18 | 100 | 11.5 | To drag chain |
|  | AF | 0.012 |  |  |  |  |  |
| 18 | AD | 0.048 | 4.37 | 15-18 | 100 | 8.8* 8.7 9.8 8.1 8.7 9.1 | To drag chain |
|  | AF | 0.024 |  |  |  |  |  |

*Multiple tests for % Air run hourly.

TABLE III-continued
Western Location Manufacturer's Cement Lab Test Results

| Test No. | Product | Solution Conc (%) | Feedrate mLs/ 350 g | Feedrate Gal/ Ton | % Air | Comments |
|---|---|---|---|---|---|---|
| | | | | | | subsequent testing |
| 3 | None | — | — | — | 9.1 | |
| 4 | None | — | — | — | 8.6 | |
| 5 | AA | 1.0 | 7.0 | 0.048 | — | Invalid - Flow = 99+% |
| 6 | AA | 1.0 | 7.0 | 0.048 | 15.2 | |
| 7 | AD | 1.0 | 7.0 | 0.048 | — | Invalid- FLOW = 96% |
| 8 | AK | 1.0 | 7.0 | 0.048 | 13.7 | |
| 9 | AS | 1.0 | 7.0 | 0.048 | 12.8 | |
| 10 | AD | 1.0 | 7.0 | 0.048 | 14.6 | |
| 11 | NONE | — | — | — | 9.3 | |
| 12 | AA | 1.0 | 7.0 | 0.048 | 15.1 | |
| 13 | AA | 1.0 | 7.0 | 0.048 | 12.3 | |
| | AF | 1.0 | | 0.048 | | |
| 14 | AA | 1.0 | 7.0 | 0.048 | 15.3 | |
| | AH | 1.0 | | 0.048 | | |
| 15 | AA | 1.0 | 7.0 | 0.048 | — | Invalid - Flow = 97% Caustic added to AR |
| | AR | 1.0 | | 0.048 | | |
| 16 | AA | 1.0 | 7.0 | 0.048 | 15.8 | Caustic added to AR |
| | AR | 1.0 | | 0.048 | | |
| 17 | AA | 1.0 | 7.0 | 0.048 | — | Invalid - Flow = 100+% |
| | AI | 1.0 | | 0.048 | | |
| 18 | AA | 1.0 | 7.0 | 0.048 | 16.0 | |
| | AI | 1.0 | | 0.048 | | |
| 19 | AA | 1.0 | 7.0 | 0.048 | 11.2 | |
| | AJ | 1.0 | | 0.048 | | |
| 20 | AA | 1.0 | 7.0 | 0.048 | 15.2 | |
| | AR | 1.0 | | 0.048 | | |
| 21 | AA | 1.0 | 7.0 | 0.048 | 12.2 | |
| | AN | 1.0 | | 0.048 | | |
| 22 | AA | 1.0 | 7.0 | 0.048 | 14.7 | |
| | AM | 1.0 | | 0.048 | | |
| 23 | AA | 1.0 | 7.0 | 0.048 | 15.0 | |
| | AG | 1.0 | | 0.048 | | |
| 24 | None | — | — | — | 8.4 | |
| 25 | AA | 1.0 | 7.0 | 0.048 | 15.2 | |
| 26 | AA | 1.0 | 7.0 | 0.048 | 11.4 | Sample prepared the previous day |
| | AF | 1.0 | | 0.048 | | |
| 27 | AA | 1.0 | 7.0 | 0.048 | 13.9 | |
| | AP | 1.0 | | 0.048 | | |
| 28 | AA | 1.0 | 7.0 | 0.048 | — | Invalid - Flow = 96% |
| | AQ | 1.0 | | 0.048 | | |
| 29 | AA | 1.0 | 7.0 | 0.048 | 14.1 | |
| | AQ | 1.0 | | 0.048 | | |
| 30 | AA | 1.0 | 7.0 | 0.048 | 15.1 | |
| | AM | 1.0 | | 0.048 | | |
| 31 | AA | 1.0 | 7.0 | 0.048 | 16.2 | |
| | AO | 1.0 | | 0.048 | | |
| 32 | AA | 1.0 | 7.0 | 0.048 | 12.8 | Sample freshly |
| | AF | 1.0 | | 0.048 | | prepared |

NOTES:
1. Tests 2-32 conducted using the same bag of Portland I/II cement.
2. Invalid tests are based on the flow properties of the cement mortar, which must be between 80-95% flow according to ASTM C185 in order for the % Air value to be valid.
3. In test 15 and 16, 50% caustic (NaOH) was added to the mixture (products) in order to solubilize the organic component (oleic acid → sodium oleate).
4. In tests where blends (2) of products were evaluated, the products were mixed and applied as one solution, e.g., in test #13, 7 mL of a solution containing 1% AA + 1% AF was added yielding a feedrate of 0.048 gal/ton of each component.
5. Except for test #26, all blends of products were prepared freshly prior to testing. Therefore, test #26 may be invalid, or considered not representative for comparison with the other data.

TABLE IV
Laboratory Foam Studies

| Test No. | Treatment(s) | Feedrate (%) | Foam Volume (cc) D.I. H$_2$O | Foam Volume (cc) 1000 ppm Ca$^{++}$ |
|---|---|---|---|---|
| 1 | AD | 1.00 | 75 | 15 |
| 2 | AA | 1.00 | 70 | 35 |
| 3 | AK | 1.00 | 80 | 10 |
| 4 | AS | 1.00 | 80 | 5 |
| 5 | Equex S | 0.75 | 55 | 0 |
| 6 | Bioterge AS-40 | 0.25 | 50 | 20 |
| 7 | Biosoft D-40 | 0.25 | 50 | 15 |
| 8 | Steol KS-460 | 0.25 | 45 | 25 |
| 9 | Alkamide CDO | 0.25 | 50 | 50 |
| 10 | Emersol 210* | 0.50 | 50 | 0 |

*50% Caustic (NaOH) added to make the sodium salt (oleic acid → Na oleate)

KEY 1 (For Tables I-IV)
Cement Clinker Dust Control Testing Product Formulations 1. AA: 15% Bioterge AS-40, 9.0% Steol KS-460
2. AB: 30.0% Lignosol XD, 1.0% PF 3, 1.0% Surfonic N-95
3. AC: 70.0% Ethylene Glycol, 1.0% Aerosol GPG
4. AD: 23.0% Biosoft D-40, 4.0% Bioterge AS-40
5. AE: 40.0% Astrowet O-75, 15.0% Hexylene Glycol, 5% Butyl Cellosolve
6. AF: 100% Tufflo 105
7. AG: 99% Shellflex 3311, 1% Paratac
8. AH: 30.0% Pluracol W5100
9. AI: 100.0% SAG-10
10. AJ: 12.0% Alfol 20+ Alcohol
11. AK: 20.0% Equex S, 5% Alkamide CDO
12. AL: 100% Mentor 28
13. AM: 100% Shellflex 3311
14. AN: 100% Shellflex 3681
15. AO: 100% Hydrolene 90
16. AP: 100% Witco 2013-20
17. AQ: 100% Telura 323
18. AR: 100% Emersol 210
19. AS: 21.9% Biosoft D-40, 5.0% Emersol 210, 3.8% Bioterge AS-40

NOTE: Minor constituents (<1%) not included in the above formulations.

KEY 2 (Used with key 1)
Cement Clinker Dust Control Testing Raw Material Specifications

| Trade Name | Manufacturer | % Actives | Description |
|---|---|---|---|
| Bioterge AS-40 | Stepan Co. | 40 | Sodium alpha olefin sulfonate |
| Steol KS-460 | Stepan Co. | 60 | Sodium alkyl ether sulfate |
| Lignosol XD | Reed Lignin | 100 | Sodium lignosulfonate |
| PF 3 | Betz Laboratories | 3 | Acrylamide copolymer |
| Surfonic N-95 | Texaco Chemical Co. | 100 | Nonylphenoxy polyethoxy ethanol |
| Aerosol GPG | American Cyanamid | 70 | Sodium dioctyl sulfosuccinate |
| Biosoft D-40 | Stepan Co. | 40 | Sodium alkyl aryl sulfonate |
| Astrowet O-75 | Alco Chemical Corp. | 75 | Sodium dioctyl sulfosuccinate |
| Pluracol W5100 | BASF Wyandotte | 100 | Polyalkylene glycol |
| SAG-10 | Union Carbide | 10 | Silicon emulsion |

-continued

KEY 2 (Used with key 1)
Cement Clinker Dust Control Testing Raw Material Specifications

| Trade Name | Manufacturer | % Actives | Description |
| --- | --- | --- | --- |
| Alfol 20+ Alcohol | Vista (Conoco) | 74 | Fatty alcohol |
| Equex S | Proctor & Gamble | 30 | Sodium lauryl sulfate |
| Alkamide CDO | Alkaril Chemicals | 100 | Coconut diethanolamide |
| Emersol 210 | Emery Chemicals | 100 | Oleic acid |
| Paratac | Exxon Chemicals | ? | Polyisobutylene, high molecular weight |
| Mentor 28 | Exxon | 100 | Paraffinic process oil, 50 SSU @ 100° F. |
| Tufflo 105 | Arco | 100 | Naphthenic process oil, 108 SSU @ 100° F. |
| Telura 323 | Exxon | 100 | Naphthenic process oil, 108 SSU @ 100° F. |
| Witco 2013-20 | Witco, Golden Bear | 100 | Naphthenic process oil, 107 SSU @ 100° F. |
| Shellflex 3311 | Shell | 100 | Naphthenic process oil, 275 SSU @ 100° F. |
| Shellflex 3681 | Shell | 100 | Naphthenic process oil, 800 SSU @ 100° F. |
| Hydrolene 90 | Sunoco | 100 | Aromatic process oil, 3500 SSU @ 100° F. |

DISCUSSION-Tables I-IV

In Table I, a number of foaming agent formulations are applied as foam to hot (200°-400° F.) cement clinker, downstream of the clinker cooler, at a Western cement plant. The data show product and total foaming solution feedrates, foam generator back pressure (higher pressures generally indicate higher expansion foams), % dust suppression (visual estimate) and % air (ASTM C185).

Of particular importance are Tests No. 5-8, which show that dust suppressing amounts of a traditional foaming agent formulation significantly increase the air content of cement mortar prepared from foam treated clinker according to ASTM specifications. At lower foaming agent feedrates, % air values decrease, but % dust suppression also decreases to marginal levels.

Also of importance are Tests No. 8 and 9, which a dust control treatment was applied as a spray (wet suppressant) to the drag chain used to convey the clinker. These data show that a traditional wet suppression treatment approach provides only marginal dust control (50%), with deleterious effects on the air content of treated clinker mortar and material handling properties (drag chain pluggage).

In Tests No. 10-14, foams comprising foaming agent (A) and anti-foam (AF) were applied at various treatment and solution feedrates. These data clearly show that incorporating an anti-foam (light viscosity process oil) into the foam formulation results in reduced air values compared to foaming agent alone. For example, in Test No. 6, 0.021 gal/ton of foaming agent AA is applied resulting in 90% dust suppression and 16.5% air values. For comparison, in Test No. 12, approximately the same foaming agent feedrate is used (0.024 gal/ton of AA) in combination with anti-foam (0.095 gal/ton of AF) resulting in an increase in dust suppression (100%) and decrease in air content (7.8-8.4%) compared to foaming agent alone.

In an attempt to reduce the effects of the foaming agent portion of the foam/anti-foam formulation, a low salt tolerant foaming agent formulation was tested. As indicated by Test No. 15, the low salt tolerant formulation had significantly less of an effect on the air content of treated clinker cement mortar (e.g., compared to Test No. 6). Combining the low salt tolerant foaming agent (AD) and light viscosity process oil (AF) resulted in what is believed to be a near optimum foam formulation for cement clinker, as illustrated by the data for Test No. 18.

The results of preliminary laboratory testing conducted to confirm and/or predict the effects of foaming agent formulations on the air content of cement mortar are shown in Table II. Treatments were added to the water used in preparing cement mortar according to ASTM C305. In general, these data correlate with comparative field data (Table I). Of possible concern is the fact that in Test No. F, the AA and AF products were added to the mortar mix separately, whereas in the field, the products are combined to produce an emulsion prior to treating the calcined clinker material. Also, the effects of the low salt tolerant foaming agent (AD) compared to the traditional foaming agent (AA) on air content are subtle, whereas the field data are more definitive and conclusive. Based on these preliminary data, further laboratory testing was warranted (Table III).

Table III summarizes the results of a second laboratory study conducted to determine the effects of foaming agent formulations on the air content of cement mortar. As indicated, a single bag of Portland I/II cement was used for Tests No. 2-32 to ensure consistent physical and chemical properties of the cement mortar. All testing was performed according to ASTM specifications, using ASTM approved equipment, mortar constituents and methodology.

Of interest in Table III are Tests No. 6, and 8-10, in which foaming agent formulations with varying degrees of salt (calcium) tolerance were evaluated. As will be discussed later (Table IV), the degree of salt tolerance exhibited by the formulations tested in the aforementioned test series follows AA>AD>AK>AS (i.e., the foaming properties of AA are least affected by the presence of inorganic salts), which follows exactly the order of increased air induced by the addition of foaming agent to the cement mortar. Therefore, in consideration of the field data presented in Table I, these data suggest that formulations AD, AK and AS would be suitable low calcium tolerant foaming agents for use under the preferred embodiment of this invention.

Also of importance are Tests No. 13, 14, 16, and 18-20. In these tests, a number of generically different anti-foam materials were tested in combination with foaming agent AA. The results show that, while all anti-foam materials are not effective at reducing foaming agent related air entrainment, at least two chemically different anti-foam agents (light viscosity process oil and long-chain fatty alcohol, or products AF and AJ, respectively) are suitable for the aforementioned purpose. It would follow, therefore, that a number of heretofore untested anti-foam formulations may also be suitable for reducing foaming agent related air entrainment in cement mortars, and the use thereof would be considered an obvious embodiment of this invention.

In Tests No. 13, 21-23, 26-27, and 29-32, a number of different process oils were evaluated to determine their defoam/antifoam properties in combination with foaming agent AA. The general trend appears to be that the lighter viscosity oils (50-280 SSU @ 100° F.) are efficacious in reducing foaming agent related air entrainment, whereas the heavy process oils (800-3500 SSU @ 100° F.) have either no effect or, in the case of oil AO (3500 SSU @ 100° F.), actually increase air content compared to foaming agent alone.

Of possible interest are the data in Table IV, which illustrate the effects of water hardness ($Ca^{++}$) on the foaming properties of a number of surfactants and foaming agent formulations. In particular, in Tests No. 1-4, the data show the relative calcium (salt) tolerance of the foaming agent formulations discussed previously regarding the effects of salt tolerance on foaming agent related air entrainment (Table III, Tests No. 6, 8-10).

At present, it is preferred to use a combination of Product "AD" and "AF."

| | | SUGGESTED FEEDRATES Foamed Dust Control Stage | | | | | |
| --- | --- | --- | --- | --- | --- | --- | --- |
| | Total Foaming | Product "AD" | | | Product "AF" | | |
| Dosage Ranges | Solution (Gal/Ton of Clinker) | Gal/Ton of Clinker | ppm on Clinker | % in Foaming Solution | Gal/Ton of Clinker | ppm on Clinker | % in Foaming Solution |
| Most Preferred | 4.0 | 0.050 | 200 | 1.25 | 0.0250 | 100 | 0.63 |
| Preferred | 2.5-5.0 | 0.025-0.100 | 100-400 | 1.00-2.00 | 0.0125-0.0500 | 50-200 | 0.50-1.00 |
| Exemplary | 1.0-10.0 | 0.005-0.500 | 20-2000 | 0.50-5.00 | 0.0025-0.2500 | 10-1000 | 0.25-2.50 |

| | SUGGESTED FEEDRATES Mortar Mixing Stage | |
| --- | --- | --- |
| | ppm in Mortar | |
| Dosage Ranges | "AD" | "AF" |
| Optimum | 30-40 | 15-20 |
| Most Preferred | 15-80 | 7.5-40 |
| Preferred | 3-400 | 1.5-200 |

Actual Field Use

Foam is produced by combining the chemical solution (containing from about 0.5 to 5% foaming agent) with air at a ratio of about 1.0 gal solution:1.0 to 10.0 scf air. The air and solution are metered and controlled at their respective flow rates to maintain consistent foam production and quality. The air and solution combine at a point immediately upstream of a mixing chamber. The mixing chamber may be a packed column, venturi, or static mixer. The purpose of the mixing chamber is to induce the air in water dispersion defined as foam. Said foam is then sprayed onto the cement clinker at a point where adequate mixing of the foam and cement clinker is achieved; e.g., screw or drag chain conveyors, transfer point locations, etc. In general, acceptable foam properties include expansion ratios (volume foam:volume of solution) of about 10-100, and an average foam bubble diameter of about 0.005 to about 0.015 inch.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Method comprising suppressing dust generation emanating from cement clinker by applying foam to said clinker, said foam including an agent which exhibits antifoaming properties in cement mortar, grinding said clinker to form cement, and slurrying said cement with other ingredients to form slurried cement said antifoaming agent inhibiting foam formation in said slurried cement so as to not significantly increase air entrapped in said slurried cement.

2. Method as recited in claim 1 wherein said foam comprises water and surfactant.

3. Method as recited in claim 2 wherein said surfactant comprises a member or members selected from the group consisting a anionic and nonionic surfactants.

4. A method as defined in claim 2 wherein said foam further comprises oil antifoaming agent.

5. A method as defined in claim 4 wherein said oil has an SUS viscosity at 38° C. of from about 60 to about 600.

6. A method as defined in claim 5 wherein said oil has an SUS viscosity at 38° C. of from about 60 to about 300.

7. A method as defined in claim 4 wherein between about 10 to 1,000 ppm of said oil per million parts of said clinker are applied to said clinker in said application step.

8. A method as recited in claim 4 wherein in said slurrying step said oil is diluted to about 1.5 to 200 ppm in said slurry so as to thereby inhibit foam formation in said slurried cement.

9. A method as recited in claim 2 wherein said foam further comprises effective fatty alcohol antifoaming agent.

10. Method comprising suppressing dust generation emanating from cement clinker by applying foam comprising water, surfactant and oil to said clinker, grinding said clinker to form cement, slurrying said cement with other ingredients to form slurried cement and inhibiting foam formation in said slurried cement so as to not significantly increase air entrapped in said slurried cement.

11. A method as defined in claim 10 wherein the said oil has an SUS viscosity at 38° C. of from about 60 to about 600.

12. A method as defined in claim 11 wherein said oil has an SUS viscosity at 38° C. of from about 60 to about 300.

13. A method as defined in claim 10 wherein between about 10 to 1,000 ppm of said oil per million parts of said clinker are applied to said clinker in said application step.

14. A method as recited in claim 10 wherein in said slurrying step said oil is diluted to about 1.5 to 200 ppm in said slurry so as to thereby inhibit foam formation in said slurried cement.

* * * * *